United States Patent

[11] 3,586,955

[72] Inventor Edmund Kisiel
Garfield Heights, Ohio
[21] Appl. No. 022,123
[22] Filed Mar. 31, 1970
[45] Patented June 15, 1971
[73] Assignee Crawford Fitting Company
Solon, Ohio
Continuation of application Ser. No.
603,962, Dec. 22, 1966, now abandoned.

[54] BATTERY CHARGER USING A CONTROLLED SCR TO PROVIDE TAPERING CHARGING CHARACTERISTICS
13 Claims, 1 Drawing Fig.

[52] U.S. Cl. .................................................. 320/39,
320/32, 321/19, 323/6
[51] Int. Cl. .................................................. H02j 7/06
[50] Field of Search .......................................... 320/31, 32,
33, 39, 40, 61, DIG. 1, DIG. 2; 321/19; 323/6, 22 SC

[56] References Cited
UNITED STATES PATENTS
3,310,729  3/1967  Burgess et al. ............... 321/18 X
3,375,427  3/1968  Magner et al. ............... 321/5
3,414,774  12/1968  Motta ........................ 320/31 X
2,714,188  7/1955  Scherer ...................... 323/6 X
3,241,053  3/1966  Woodley ..................... 323/22 X
3,300,704  1/1967  McMillen .................... 320/61
3,363,163  1/1968  Nord et al. .................. 320/31
3,382,425  5/1968  Legatti ....................... 320/32

Primary Examiner—J. D. Miller
Assistant Examiner—John M. Gunther
Attorney—Fay, Sharpe and Mulholland ABSTRACT: The battery charger comprises a transistorized system comprising a stepdown transformer coupled to a silicon-controlled rectifier, with the power output of the rectifier controlled by a sensing network in circuit with phase shift circuit means. A Zener diode is provided which furnishes a reference voltage applied across a voltage divider in the sensing circuit wherein no current can flow to a battery so long as the battery voltage equals the reference voltage. If the battery voltage drops due to a load or for some other reason, current will bias a transistor into a conduction condition to actuate the phase shift network. The latter is coupled to the silicon-controlled rectifier to gate the rectifier in a manner automatically to charge the battery at a rate inversely proportional to the amount of charge on the battery.

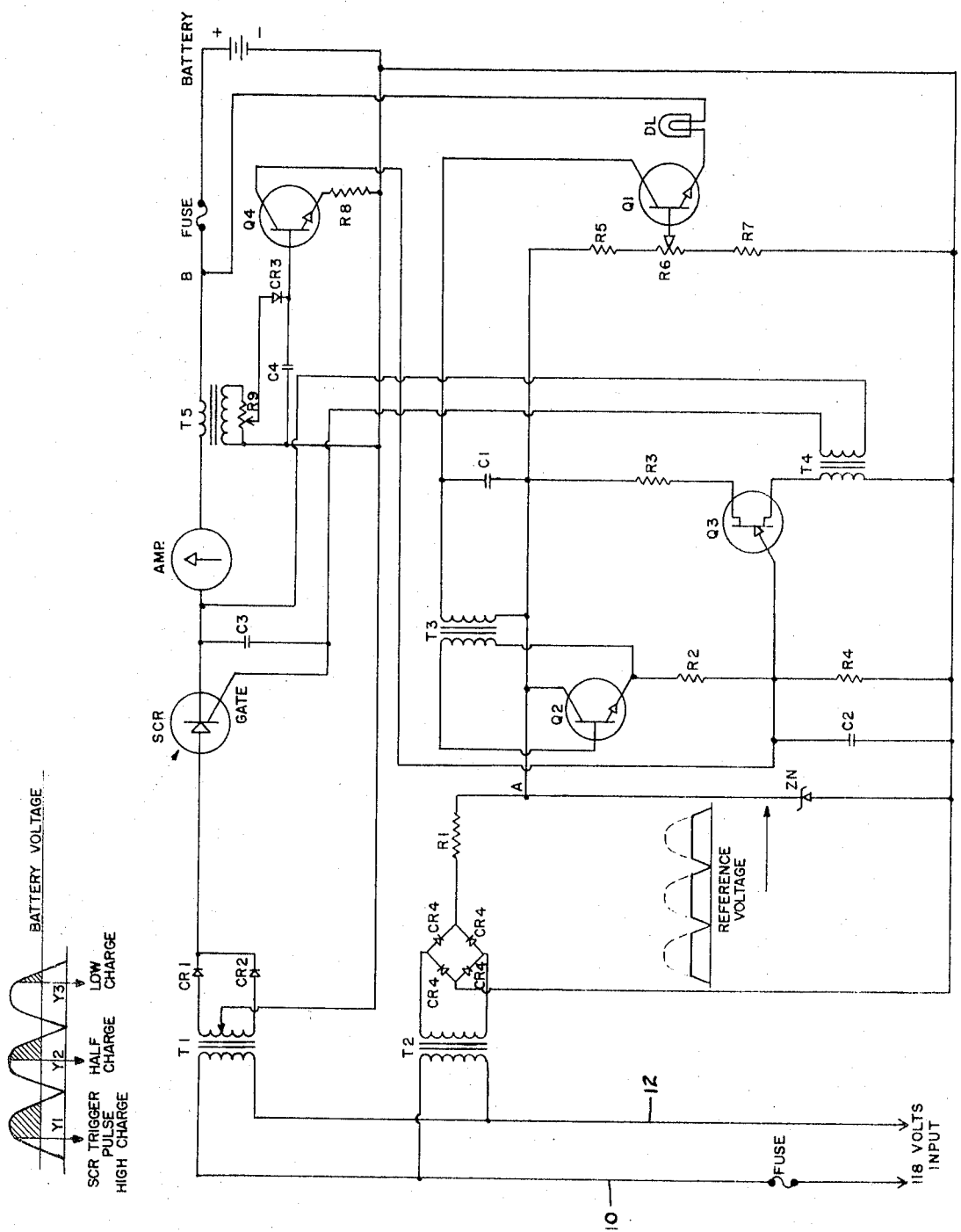

BATTERY CHARGER USING A CONTROLLED SCR TO PROVIDE TAPERING CHARGING CHARACTERISTICS

This is a continuation of application Ser. No. 603,962, filed Dec. 22, 1966 by the same inventor.

The present invention relates to an automatic control system for a battery charger and more particularly to a system utilizing a phase shift circuit to control an electronic rectifier of the type having a gate electrode.

Battery operation of many types of electrical equipment has come into wide and varied use in present-day situations, and an automatic recharging mechanism for batteries is generally desirable and sometimes mandatory.

The present invention provides a battery-charging circuit including an electronic rectifier having a gate electrode which is controlled by a phase shift system circuit so as to vary the power output of the electronic rectifier in inverse proportion to the charge on the battery.

Accordingly an object of the invention is to provide an automatic control system for a battery-charging device.

A further object of the invention is to provide an automatic control system of the latter type which is transistorized.

A still further object of the invention is to provide an automatic control circuit of the above-mentioned type including an electronic rectifier controlled by a phase shift circuit so that the charging current is inversely proportional to the charge on the battery.

Other objects and advantages of the invention will be apparent from the following description taken in conjunction with the accompanying drawings wherein the FIGURE is a schematic diagram of the battery-controlled circuit of the invention.

As illustrated, a source of charging current for the battery control circuit may be supplied from conventional main powerlines 10 and 12 providing alternating current which is reduced to proper voltage and which is then introduced into the control circuitry. The current from the alternating current commercial powerlines may be passed to a stepdown transformer T1 having a center-tapped secondary, with each leg of the secondary being connected to rectifiers CR1 and CR2 thereby providing for full-wave rectification of the transformer secondary current. The resultant pulsating direct current flows to an electronic rectifier SCR, which may be a silicon-controlled rectifier which will not conduct a current until the gate electrode thereof is triggered by a pulse. The importance of the silicon-controlled rectifier lies in the ease with which its conduction can be initiated and timed. Once the gate of the rectifier SCR is triggered, the rectifier will continue to conduct current from the anode to the cathode until the anode voltage drops to near zero with reference to the cathode. With a 60-cycle supply source of the anode, the voltage would drop to near zero as previously discussed about 120 times per second due to the full-wave rectification of rectifiers CR1 and CR2. Accordingly, the gate electrode is adapted to be triggered 120 times per second, with the power output being controlled by a phase shift method.

As diagrammatically illustrated in the drawing in the upper left-hand corner thereof, if the gate is triggered at the beginning of each half-cycle, the power output would be maximum. If the pulse is delayed, the power output would correspondingly fall off to a lower value, since the current can now only flow during the remainder of each half-cycle, for example, as shown in the shaded portion of said pulse. If the pulse is delayed further, a point will be reached where the instantaneous voltage of the half-wave will equal the battery voltage. If the SCR rectifier would be pulse triggered at this point, no current could flow, since both voltages would be equal and the charging current would be zero.

The phase shift pulse may be provided in the following manner:

Transformer T2 in circuit with powerlines 10 and 12, supplies an AC voltage, which is rectified full wave through bridge-connected rectifiers CR4. The resultant pulsating direct current then flows through a limiting resistor R1, and is then applied across a Zener diode ZN.

The diode ZN will not conduct until the voltage applied thereacross reaches the critical avalanche, or Zener point. As the input voltage is increased above this Zener point, current will flow through the diode, keeping the voltage constant, providing a pulsating flat-topped wave as illustrated in the drawing, entitled Reference Voltage, which will remain constant regardless of line voltage fluctuations. These flat-topped waves are now the reference voltage, as shown in point A of the drawing.

The reference voltage is applied across a voltage divider comprising resistor R5, potentiometer R6, and resistor R7. Potentiometer R6 is set for the required full-charge battery voltage. Under these conditions, the flat-topped reference voltage is adapted to equal the battery voltage and, therefore, no current can flow through transistor Q1. Should the battery voltage drop, due to a load or leakage, the reference voltage will then be higher than battery voltage. This change in voltage will bias transistor Q1 into conduction, current-flowing base to emitter through protective lamp DL to the positive side of battery.

Since the flat-topped reference voltage waves are almost square waves when applied to the collector of Q1, the resultant amplified pulses are applied to primary of transformer T3. The pulses are broadened out by capacitor C1.

The secondary of transformer T3 is coupled to transistor Q2 causing it to conduct, permitting current to flow from its emitter through resistor R2, charging the capacitor C2, which forms the phase shift network. When the voltage on capacitor C2 reaches the critical voltage, a unijunction transistor Q3 will conduct, discharging capacitor C2 through the primary of transformer T4, generating a pulse which is coupled into secondary winding of transformer T4. The secondary of transformer T4, in turn, is connected between the gate and cathode of the silicon-controlled rectifier SCR, causing it to conduct. The lower the battery voltage, the greater will be the amplitude of the pulse on transistors Q1 and Q2, and the greater will be the current flow through the transistor Q2, thereby charging the capacitor C2 sooner, and causing unijunction transistor Q3 to fire closer to the beginning of each half-cycle, thus gating SCR sooner to put out more power.

Since all the transistors have pulsating DC applied to their respective collectors of Q1 and Q2, and base of Q3, the whole phase shift network is synchronized, or locked, thereby giving smooth control from zero charge to full charge.

Resistor R4 leaks off any residual charge on capacitor C2 between each half-cycle. Current-limiting control transformer T5 samples pulsating DC charging current flowing through its primary to the battery, then steps up the voltage in its secondary, potentiometer R9 being the secondary load of transformer T5.

Potentiometer R9 is set for the required limit current. The resultant AC voltage is rectified by CR3, charging capacitor C4, which in turn biases transistor Q4 into conduction, which in turn leaks off some of the charge on capacitor C2, causing it to charge slower (shifting phase) thereby delaying the firing of unijunction transistor Q3, and cutting down the charging rate, should the load on the battery exceed the charging rate of the charger.

Resistor R8 supplies protective bias for transistor Q4. Capacitor C3 across the cathode-gate of the SCR bypasses any extraneous spikes or R.F. energy so as to prevent said energy from triggering the SCR.

Lamp DL is a low-current lamp to protect transistor Q1 from accidental shorts in the battery or wrong polarity of the battery, by behaving as a positive temperature coefficient bias resistor or, in extreme cases, as a fuse.

Transformer T2 providing the reference voltage could be eliminated by providing an extra secondary on transformer T1 for purposes of establishing the reference voltage.

While the control circuit illustrated is adapted for charging 12-volt batteries, the identical circuit could be used for lower battery voltage by lowering the secondary voltage of transformer T1, and readjusting the values of resistors R5 and R6 of the voltage divider network. The circuitry could also be used for higher battery voltage by, for instance, raising the secondary voltage of transformer T1 and placing a simple fixed voltage divider across the battery and the connecting tap B of the protective lamp DL.

From the foregoing description and accompanying drawings it will be seen that the invention provides an automatic battery-charging system utilizing a phase shift control circuit to control triggering of an electronic rectifier in the system so as to vary the power output of the rectifier in inverse proportion to the charge on the battery.

The terms and expressions which have been used are used as terms of description and not of limitation, and there is no intention in the use of such terms and expressions of excluding any of the features shown or described, or portions thereof, and it is recognized that various modifications are possible within the scope of the invention claimed.

I claim:

1. A circuit for charging a battery comprising:
   a source of current,
   a control circuit including a controlled electronic rectifier having at least an anode, a cathode, and a gate electrode, said anode being connected to said source of current, said cathode being adapted for connection in circuit with a battery,
   a sensing circuit for sensing the potential on a battery and providing a sensing signal when said potential is below a predetermined level,
   means coupled to said sensing circuit for providing a predetermined constant reference voltage thereto, said sensing signal being produced when said reference voltage is greater than said predetermined level,
   control means in circuit with said sensing circuit and with said controlled electronic rectifier for triggering the conduction of said controlled electronic rectifier in response to said sensing signal to cause charging of a battery at a rate inversely proportional to the amount of charge on the battery, and
   current-limiting means in circuit with said controlled electronic rectifier for limiting the charging rate to a battery, said current limiting means comprising:
     a transformer comprising a primary and a secondary, said primary being in circuit with the cathode of said controlled electronic rectifier;
     a potentiometer in circuit with the secondary of said transformer and comprising a load therefor, said potentiometer determining the maximum permissible current flow to a battery; and
     transistor means in circuit with said potentiometer and said control means for providing a signal to said control means to affect the conduction of said controlled electronic rectifier in such a manner that the charging rate is reduced when the charging rate to a battery in response to said sensing signal would otherwise be greater than said maximum permissible current flow.

2. In a control circuit of the type which comprises a first source of DC voltage, a controlled rectifier including an anode electrode and a cathode electrode which define a current path therebetween, said current path being in circuit with said first source, and a gate electrode for controlling the current flow in said path, and a battery in circuit with said current path, the improvement which comprises control means for controlling the current flow in said current path to a rate which causes charging of the battery at a rate inversely proportional to the charge on said battery, said control means including:
   sensing means in circuit with said battery for sensing the charge on said battery and providing a sensing signal indicative thereof, said sensing means including first transistor means capable of being rendered conductive to provide said sensing signal when the charge on said battery is below a predetermined level,
   conduction control means for causing said first transistor means to conduct when the charge on said battery is below said a a predetermined level, said conduction control means comprising a source of reference potential and variable resistance means in circuit with said source of reference potential and said first transistor means,
   gate control means in circuit with said first transistor means and said gate electrode for controlling the average current flow in said current path in response to the magnitude of the sensing signal from said transistor means, said gate control means including second transistor means in circuit with said first transistor means, charge storage means in circuit with said second transistor means, wherein said second transistor partially determines the rate of charge and discharge of said charge storage means, and unijunction transistor means in circuit with said charge storage means, said resistive means and said gate electrode of said controlled rectifier, said unijunction transistor means providing a control signal to said gate electrode in response to the rate of charge and discharge of said charge storage means, and
   current-limiting means in said current path for limiting the charging rate to said battery, said current-limiting means comprising transformer means in circuit with said controlled rectifier and fourth transistor means in circuit with said transformer means and said unijunction transistor means for partially controlling the rate of charge and discharge of said charge storage means to limit the charging rate to said battery.

3. A control circuit comprising the combination of: a first source of DC potential which includes a first terminal and a second terminal, a controlled rectifier including an anode electrode and a cathode electrode which define a current path therebetween said current path being in circuit with said first terminal of said first source of DC potential and a gate electrode for controlling the current flow in said path, and a battery including a first terminal in circuit with said current path and a second terminal in circuit with said second terminal of said first source of DC potential, and control means for controlling the current flow in said current path to a rate which causes charging of the battery at a rate inversely proportional to the charge on said battery, said control means including:
   sensing means in circuit with said battery for sensing the charge on said battery, said sensing means including a first transistor which is biased to be normally nonconductive and which is caused to conduct to provide a sensing signal when the charge on said battery is below a predetermined level,
   means for causing said first transistor to conduct at a predetermined level comprising a first source of reference potential, and variable resistance means in circuit with said first source of reference potential and the base of said first transistor means so that adjustment of said variable resistance means varies said predetermined level,
   gate control means in circuit with said first transistor means and said gate electrode for controlling the average current flow in said current path in response to the conduction of said transistor means, said gate control means including a second transistor in circuit with said first transistor for receiving said sensing signal and providing an output signal in response thereto, charge storage means in circuit with said second transistor for receiving said output signal, resistive means in circuit with said charge storage means and said second transistor for partially determining the rate of charge and discharge of said charge storage means, and unijunction transistor means in circuit with said charge storage means, said resistive means and said gate electrode of said controlled rectifier for providing a control signal to said gate electrode which is responsive to the rate of charge and discharge of said charge storage means, a first transformer coupling said first transistor to said second transistor, and a second source of DC potential isolated from said first source of DC potential, said first source of DC potential and said second source of DC potential being derived from a common source of AC potential.

4. The circuit as defined in claim 3 further including second transformer means for coupling said unijunction transistor means to said gate electrode.

5. A circuit for charging a battery comprising:
a source of current including a source of AC potential, a first transformer in circuit with said source of AC potential, and a full-wave rectifier in circuit with said first transformer,
a control circuit including an electronic rectifier having an anode, a cathode, and a gate electrode, said anode being in circuit with said full-wave rectifier, said cathode being adapted for connection in circuit with a battery wherein said sensing circuit for sensing the charge on a battery wherein said sensing means includes a first transistor which is normally biased to be nonconductive, and which is caused to conduct when the potential on a battery falls below a predetermined level, the level of conduction of said first transistor being proportional to the amount by which the potential on a battery is below the predetermined potential, said sensing circuit further including a second transformer means in circuit with said source of AC potential, and rectifier means for providing full-wave rectification of the signal at the output of the second transformer,
means coupled to said sensing circuit for providing a predetermined constant reference voltage,
third transformer means for coupling a control signal to said gate electrode, and
control means in circuit with said sensing circuit and with said rectifier through said third transformer means for automatically controlling the conduction of said electronic rectifier to cause charging of a battery at a rate inversely proportional to the amount of charge on the battery.

6. The circuit as defined in claim 5 wherein said sensing circuit further comprises a voltage divider including a potentiometer in circuit with said first transistor, said potentiometer being adapted for setting at a predetermined full-charge battery voltage so that said first transistor is nonconductive, and so that said first transistor conducts when the reference voltage is higher than the battery voltage.

7. The circuit as defined in claim 5 further including current-limiting means in circuit with said rectifier for limiting the charging rate to a battery.

8. The circuit as defined in claim 5 wherein said control means includes a phase shift circuit including a capacitor which controls the signal applied to the gate electrode of said rectifier.

9. The circuit as defined in claim 8 wherein said control means further includes a unijunction transistor in circuit with said capacitor and said gate electrode of said rectifier.

10. The circuit as defined in claim 5 wherein said sensing circuit further includes voltage divider means including spaced resistances and a potentiometer, said potentiometer being coupled to the base of said first transistor and to said source of reference potential.

11. The circuit as defined in claim 5 including means in said sensing circuit for protecting the sensing circuit from damage due to reversing the polarity of a battery applied to said sensing means.

12. The circuit as defined in claim 5 wherein said control means includes a second transistor, phase shift means comprising a capacitor in circuit with said second transistor to provide a pulse for triggering the gate of said rectifier upon energization by said sensing circuit.

13. The circuit in accordance with claim 5 wherein said reference voltage is maintained at a constant level by a Zener diode.

UNITED STATES PATENT OFFICE
CERTIFICATE OF CORRECTION

Patent No. 3,586,955            Dated June 22, 1971

Inventor(s) Edmund Kisiel

It is certified that error appears in the above-identified patent and that said Letters Patent are hereby corrected as shown below:

On the cover sheet [45] "June 15, 1971" should read -- June 22, 1971 --.

Signed and sealed this 18th day of April 1972.

(SEAL)
Attest:

EDWARD M. FLETCHER, JR.          ROBERT GOTTSCHALK
Attesting Officer                 Commissioner of Patents